United States Patent
Trachanas et al.

(10) Patent No.: US 10,391,785 B1
(45) Date of Patent: Aug. 27, 2019

(54) SHRINK-PRINT METHOD FOR DETECTING AND COMPENSATING FOR DEFECTIVE PRINTING NOZZLES IN AN INKJET PRINTING MACHINE

(71) Applicant: HEIDELBERGER DRUCKMASCHINEN AG, Heidelberg (DE)

(72) Inventors: Ilias Trachanas, Plankstadt (DE); Axel Hauck, Karlsruhe (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 16/192,035

(22) Filed: Nov. 15, 2018

(30) Foreign Application Priority Data

Feb. 6, 2018 (DE) .................... 10 2018 201 785

(51) Int. Cl.
| | | |
|---|---|---|
| B41J 2/21 | (2006.01) | |
| G06K 15/10 | (2006.01) | |
| G06T 7/00 | (2017.01) | |
| B41J 2/195 | (2006.01) | |

(52) U.S. Cl.
CPC ............. *B41J 2/2142* (2013.01); *B41J 2/195* (2013.01); *B41J 2/2139* (2013.01); *B41J 2/2146* (2013.01); *G06K 15/102* (2013.01); *G06T 7/001* (2013.01); *G06T 2207/30144* (2013.01)

(58) Field of Classification Search
USPC ............................................. 347/12, 14, 19
See application file for complete search history.

(56) References Cited

U.S. PATENT DOCUMENTS

| | | | |
|---|---|---|---|
| 6,347,857 B1 | 2/2002 | Purcell et al. | |
| 8,412,066 B2* | 4/2013 | Moroney | G03G 15/5016 399/15 |
| 9,539,803 B2 | 1/2017 | Michel et al. | |
| 2003/0081037 A1* | 5/2003 | Gaston | B41J 2/16579 347/19 |
| 2004/0021724 A1* | 2/2004 | Kojima | B41J 29/393 347/19 |
| 2004/0085590 A1 | 5/2004 | Thiessen | |

(Continued)

FOREIGN PATENT DOCUMENTS

| | | |
|---|---|---|
| DE | 10328871 A1 | 5/2004 |
| DE | 60025742 T2 | 9/2006 |

(Continued)

*Primary Examiner* — Lam S Nguyen
(74) *Attorney, Agent, or Firm* — Laurence A. Greenberg; Werner H. Stemer; Ralph E. Locher

(57) ABSTRACT

A method for detecting and compensating for defective printing nozzles in an inkjet printing machine by using a computer, includes shrinking the height of a digitally available image to the image height of a print control strip by using the computer while the image width remains uninfluenced, printing the shrunk digital image onto a printing substrate, recording the printed shrunk digital image by using at least one image sensor, comparing the recorded image with the shrunk digital image by using the computer, detecting defective printing nozzles for the digital image by using the computer based on the comparison and compensating for the detected defective printing nozzles. The digital image is printed onto the following printing substrate by using defective printing nozzle compensation.

11 Claims, 3 Drawing Sheets

(56) References Cited

U.S. PATENT DOCUMENTS

2012/0154837 A1* 6/2012 Yamazaki .............. B41J 2/2142
358/1.9
2016/0052317 A1* 2/2016 Kyoso ....................... B41J 3/60
347/19
2018/0162134 A1 6/2018 Geissler et al.

FOREIGN PATENT DOCUMENTS

| DE | 102015207566 B3 | 4/2016 |
| DE | 102016224971 A1 | 12/2016 |
| DE | 102017220361 A1 | 6/2018 |

* cited by examiner

SHRINK-PRINT METHOD FOR DETECTING AND COMPENSATING FOR DEFECTIVE PRINTING NOZZLES IN AN INKJET PRINTING MACHINE

CROSS-REFERENCE TO RELATED APPLICATION

This application claims the priority, under 35 U.S.C. § 119, of German Patent Application DE 10 2018 201 785.9, filed Feb. 6, 2018; the prior application is herewith incorporated by reference in its entirety.

BACKGROUND OF THE INVENTION

Field of the Invention

The invention relates to a method for detecting and compensating for defective printing nozzles in an inkjet printing machine.

The technical field of the invention is the field of digital printing.

In industrial printing, digital technologies, in particular inkjet printing, are becoming more and more important. The problems inherent in inkjet printing in terms of ensuring good quality prints differ from those that occur in the previously favored process of lithographic offset printing. Of course, those inkjet-specific problems need to be specifically addressed in automated quality control processes. A main issue concerns individual defective printing nozzles in an inkjet print head. Such defective printing nozzles generate a specific defect pattern that is characteristic for inkjet printing. Those skilled in the art refer to them as "missing nozzles."

Defective printing nozzles may have various causes. A main cause is that the printing nozzles dry out if they are not used over an extended period of time. In that case, dried-on ink residues clog the printing nozzle, causing it to be unable to print at all or to print at a reduced volume or to print a dot that is offset from its desired location. Other causes for defects are dust or other particles that may clog the exit of the printing nozzle. Affected printing nozzles result in characteristic artifacts in the print that is created. For instance, in a monochrome print on a white printing substrate, a printing nozzle that has failed completely will leave a white line at the location where it can no longer contribute to the print. A printing nozzle that prints an offset print dot will likewise create a white line if the location deviates too much. However, in such a case, a dark line will additionally be created at the location where the misdirected printing nozzle actually applies ink. The color of the "white" line depends on the printing substrate that is used. Colored printing substrates, e.g. light green paper, will naturally result in a corresponding light green line. If multiple colors are printed at that location, the color values will be distorted. In a completed print, such distortions are less clear but may in most cases still be easily spotted by the human eye.

Many approaches to compensating for such defective printing nozzles and avoiding corresponding white lines have been disclosed in the prior art. Apart from providing redundant printing nozzles or print heads, it is known, for instance, to use printing nozzles that print different colors but are capable of printing at the relevant location to reproduce the missing color value of the failed printing nozzle at the relevant location in an optimum way by mixing the remaining available colors. That process will only rarely allow the missing color value to be accurately reproduced, but even an approximate value will lead to a much better print to the human eye.

In addition, the main approach to compensating for missing nozzles is to compensate for a failed or defective printing nozzle by increasing the volume of ink that is applied by the neighboring printing nozzles. In that process, the neighboring printing nozzles apply enough additional ink for it to run into the gap between them, thus closing the gap in the best possible way. In a case in which a printing nozzle has only partly failed or prints at an angle, the compensation by adjacent printing nozzles needs to be adapted in a suitable way. In general, the printing nozzles in question are completely deactivated for practical reasons and are then compensated for by the neighboring nozzles in the same way as missing nozzles. What needs to be considered in this context is that overcompensation needs to be avoided because the application of too much ink causes a corresponding dark line.

However, in order to be able to compensate for a defective printing nozzle, it first needs to be detected. For that purpose, the prior art likewise discloses a plurality of methods. The most common approach is to print test charts with at least a small test object for all printing nozzles of all print heads in use onto the printing substrate at regular intervals. Those test charts may then be measured and analyzed, preferably in an automated way by using an image recording system. If one of the image objects exhibits significant deviations, conclusions may be drawn as to the condition of the corresponding printing nozzle. That is a way of detecting defective printing nozzles with comparative reliability. However, a disadvantage of that approach is that in terms of their structure and overall character, the test charts differ from the actual print that is to be created. As a consequence, it is not always clear whether a printing nozzle that is conspicuous in the test chart will actually result in an image artifact, for instance in the form of a white line. Depending on the analysis criteria for the image objects that have been generated in the test chart, the number of defective printing nozzles that are detected by printing and analyzing the test charts often is too low. However, if the criteria are too strict, too many false positives are detected and consequently too many printing nozzles are marked as defective. In addition, the test charts take up space on the printing substrate, thus increasing waste. For precisely those reasons, only a test chart of one print color that is used is printed onto every sheet, which results in corresponding dead time until a defective printing nozzle is detected.

In order to eliminate those disadvantages, it is known from the prior art to detect defective printing nozzles in the actual print that has been generated. German Patent DE 10 2015 207 566 B3, corresponding to U.S. Pat. No. 9,539,803, for instance, discloses a method for detecting defective printing nozzles in a printed image by shifting the digital printed image relative to the print head in a direction perpendicular to the printing direction and shifting the actual print head in the opposite direction. Since the corresponding printing nozzles move on the printing substrate, it is possible to establish whether a conspicuous image element such as a white line is caused by the failure of a printing nozzle or is part of the printed image itself.

In addition, German Publication DE 10 2016 224 971.1, corresponding to allowed U.S. Publication No. 2018/0162134, discloses a method of detecting printing nozzle failures by generating a total column profile of the generated printed image and comparing it to a corresponding total column profile of an ideal reference image to detect spikes caused by white lines, which may then be allocated to defective printing nozzles.

However, there are a number of disadvantages to that process. For instance, the process relying on a total column profile does not allow artifacts that have causes other than missing nozzles to be definitely ruled out because area coverage information and other image elements get lost in the process. A problem that frequently occurs with the method that relies on shifting the digital printed image and shifting the print head in the opposite direction is that the movement of the print head in the opposite direction is not quick enough. In addition, the shifting of the print head for continuous quality control is very complex and takes a lot of effort. Moreover, detection based on the actual printed image only allows those defective printing nozzles to be identified that have actually contributed to the actual printed image. Furthermore, detection based on the actual printed image also involves a certain amount of waste because defective printing nozzles are only identified after the actual print has been created.

SUMMARY OF THE INVENTION

It is accordingly an object of the invention to provide a shrink-print method for detecting and compensating for defective printing nozzles in an inkjet printing machine, which provides an alternative to and overcomes the hereinafore-mentioned disadvantages of the heretofore-known methods of this general type.

With the foregoing and other objects in view there is provided, in accordance with the invention, a method for detecting and compensating for defective printing nozzles in an inkjet printing machine by using a computer, the method comprising the steps of shrinking the image height of a digitally available image to the image height of a print control strip by using the computer, wherein the image width remains unaffected, printing the shrunk digital image onto a printing substrate, recording the printed, shrunk, digital image by using at least one image sensor, comparing the recorded printed image to the shrunk digital image by using the computer, detecting defective printing nozzles for the digital image by using the computer based on the comparison, compensating for the detected defective printing nozzles, and printing the digital image with compensated defective printing nozzles onto the following printing substrate.

The core of the method of the invention is above all to print neither a nozzle test chart nor an area coverage element because neither one of them has the specific characteristics of the actual image to be printed. In addition, detection is not based on the actual printed image because that always means that waste is created. Instead, the image that is to be printed, which is digitally available from the preprint department, is shrunk by the computer from its normal height to a strip of only a few centimeters in height and subsequently printed by the inkjet printing machine in the manner of a test chart. Since defective printing nozzles in a print head usually leave print defects that are shaped like stripes in the printing direction, such as the aforementioned white lines, for instance, this means that to reliably detect white lines and the defective printing nozzles that cause them, it is not necessary to print the entire image. Compared to a mere total column profile as is known from the prior art, such a shrunk print has the additional advantage of including image information in terms of area coverage. This allows white lines to be reliably detected and with them the defective printing nozzles that caused them. In order to avoid waste caused by dead time until the detected missing nozzles are compensated for, the shrunk image is always printed onto the printing substrate ahead of the actual image. The width of the shrunk image remains unchanged. In addition, the shrunk image, which has the same width as the unmodified image that is to be printed later on, is to be positioned at the same horizontal position as the unmodified image to simplify pixel-nozzle allocation. The shrunk image that has been printed is then recorded and digitized by an image recording system for analyzing purposes. For this purpose, the image recording system includes at least one image sensor. In general, it has one or more RGB cameras. The analysis is done in the form of a comparison between the shrunk image that has been recorded and redigitized by the image recording system and the shrunk image that is digitally available on the computer.

Another preferred development of the method of the invention in this context is that the computer carries out the shrinking of the image height of the digitally available image in the RGB, Lab, or CMYK process color space plus optional additional process colors. If the image is not in the relevant color space, the computer converts the image to that color space. In the preprint stage, the digitally available image is generally in the RGB color space. In the course of the preparation of the printing operation, it is converted to the Lab color space and, for the printing operation, subsequently to the process color space of the inkjet printing machine, usually CMYK plus optional additional colors, usually OGV. Thus, it is clear that the shrinking of the image height of the digitally available image may be carried out in any one of three color spaces. The color space that is selected depends on the requirements of the respective printing operation and the empirical values that have been obtained using the method of the invention.

A further preferred development of the method of the invention in this context is that the computer carries out the shrinking operation by applying an interpolation process. When suitable interpolation processes are applied, the printing width of the digitally available image remains unchanged and it is only the height of the image that is shrunk. Which interpolation process is used depends on the circumstances. In general, a bicubic interpolation process is used.

An added preferred development of the method of the invention in this context is that the computer divides the shrunk digital image and the recorded image into individual color separations and carries out the comparison between color separations of the shrunk digital image and the color separations of the recorded image. In order to simplify the detection of defective printing nozzles for the computer, it is advisable to separate the recorded image into its individual color separations. This may likewise be done with the original digitally available shrunk image, allowing the comparison to be made between the individual color separations. This is also expedient because in inkjet printing, every single color is applied by a different print head and defective printing nozzles therefore influence only a specific color separation. It goes without saying that this only applies to multicolor prints. In monochrome prints, this step is dispensed with.

An additional preferred development of the method of the invention in this context is that the computer makes the comparison between the shrunk digital image and the recorded image either in the RGB, Lab, or CMYK process color space plus optional additional process colors, wherein the computer converts those images that are not in the relevant color space into the relevant color space and subsequently separates the shrunk digital image and the recorded image into the individual color separations in this color space. In most cases, the redigitized image is in the RGB color space because in most cases, the image sensor that is used is an RGB sensor. In contrast, the digitally shrunk image is also available in the Lab color space because the Lab color space is the preferred color space for preparing the printing operation at the pre-print stage. The inkjet printing machine in turn operates in a process color space involving the process colors made available to the machine, which include CMYK plus optional additional colors, usually OGV. This means that every defective printing nozzle prints a specific process color from the CMYK+OGV range. Thus, a color transformation needs to be made for both images to be in the same color space. This is the only way to ensure that a meaningful comparison between the individual color separations of the recorded shrunk image and digital shrunk image is possible. For the method of the invention, the color space in which the comparison is made is of minor importance. It makes sense to use the process color space because this is the color space the defective printing nozzle operates in. In this case, both images are converted from their respective color space, in this case RGB or Lab, to the CMYK plus OGV process color space and the comparison is then made in this color space. If a different color space is selected, the images need to be converted to this color space in a corresponding way.

Another preferred development of the method of the invention in this context is that the separation into the individual color separations and the conversion to a different color space are done by using ICC profiles. It makes sense to use ICC profiles in both processes.

A further preferred development of the method of the invention in this context is that the shrinking reduces the image height to a maximum of 10% of the original image height. The reduced print/image height needs to be carefully considered. A shrunk image that is too large takes up a lot of space, results in a corresponding amount of waste, and uses unnecessary amounts of ink. A shrunk image that is too small because it has been shrunk too much, causes too much image content, for instance in the form of the area coverage, to be lost. After shrinking, the image height should be no more than 10% of the original image height because otherwise too much waste would be produced. In most cases, orders of magnitude of no more than 5% of the original height are sufficient. For instance, an image of an original height of 70 centimeters may be shrunk to an image height of 1 cm. A 1-centimeter control element that has been created in this way is definitely sufficient for missing nozzle detection based on the method of the invention.

An added preferred development of the method of the invention in this context is that the method is used in a sheet-fed inkjet printing machine and the printed and recorded images correspond to individual print sheets. The method of the invention may of course be used for all inkjet printing processes. However, its preferred field of application is the field of sheet-fed inkjet printing. The method of the invention may be used to particular advantage in this field because on a print sheet, the digitally available images that are to be shrunk are separately present.

An additional preferred development of the method of the invention in this context is that at the latest, the printing of the shrunk digital image occurs on the print sheet immediately before the print sheet with the image to be printed. Logically, the latest possible instant to print the print/control chart present in the form of the shrunk image is the sheet preceding the sheet onto which the corresponding unshrunk image is to be printed. How many sheets ahead the shrunk test chart needs to be printed depends on the analyzing speed of the image recording system and processing time of the computer that is used as well as the time that the inkjet printing machine system needs to compensate for the detected defective printing nozzle. It is evident that there cannot be any shrunk image for the very first print sheet that is printed by the inkjet printing machine. However, since the first use of an inkjet printing machine will always involve the printing of a number of waste sheets, this does not present a problem. On the contrary, the method of the invention may even maximally reduce initial operation waste to one sheet, although this represents a best case scenario.

A concomitant preferred development of the method of the invention in this context is that in addition to the shrunk print test chart, an adapted printing nozzle detection chart is printed, likewise recorded by the at least one image sensor, and analyzed by the computer to simplify the allocation of the detected printing nozzle defects and the individual printing nozzles. Since a known disadvantage of detection based on the printed image is that the allocation of a detected print defect and the printing nozzle that caused the defect is difficult, it may be expedient to print and analyze an adapted printing nozzle detection chart in addition to the shrunk print test chart. After all, the method of the invention is a specific subspecies of a "missing nozzle" detection based on the printed image. This should make an accurate allocation of a detected white line to the associated printing nozzle that causes the white line easy to achieve. In most cases, the additional printing nozzle detection chart only needs to be printed once for every printed image that is to be checked. If more than one copy of the image is to be printed, in most cases it is sufficient to print only the shrunk printing nozzle test chart for the subsequent copies of the image and to use the printing nozzle test chart that was printed once to allocate the defect to the relevant nozzle. An alternative is to use cameras that have a correspondingly high image resolution—usually at least the image resolution of the inkjet printing machine. This would simplify the allocation of any white line to the responsible printing nozzle to a considerable extent. However, at present, the use of such high-resolution cameras is much too expensive.

Other features which are considered as characteristic for the invention are set forth in the appended claims.

Although the invention is illustrated and described herein as embodied in a shrink-print method for detecting and compensating for defective printing nozzles in an inkjet printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The invention as such as well as further developments of the invention that are advantageous in structural and/or functional terms will be described in more detail below with reference to the associated drawings and based on at least one preferred exemplary embodiment.

DETAILED DESCRIPTION OF THE INVENTION

Figure 1:
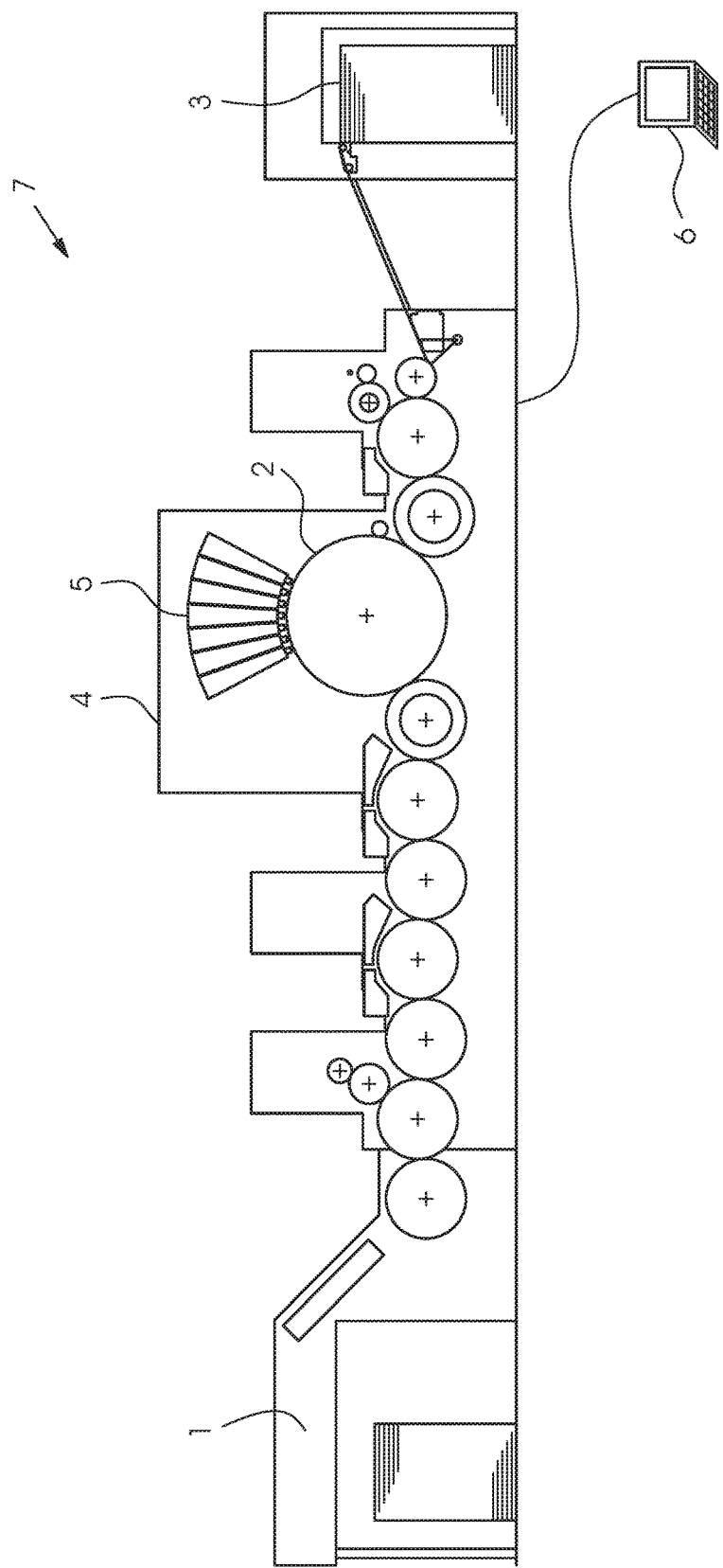
FIG. 1 is a diagrammatic, longitudinal-sectional view of an example of the structure of a sheet-fed inkjet printing machine.
Figure 2:
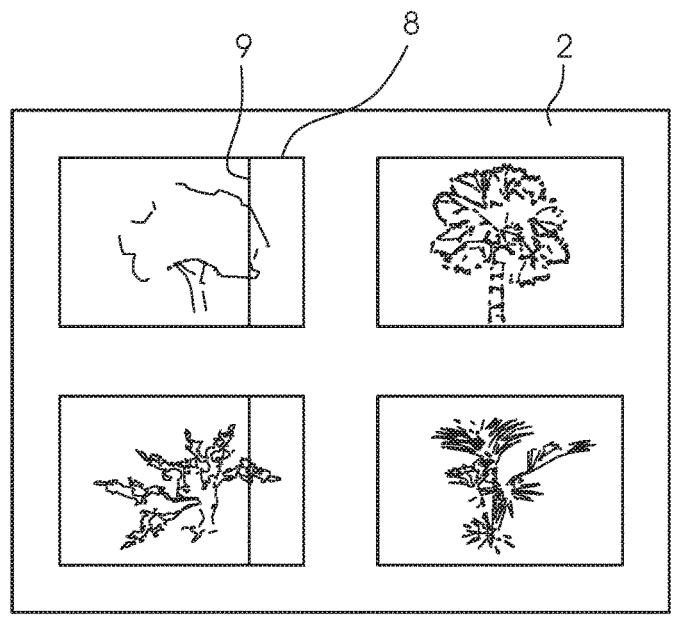
FIG. 2 is a plan view of a printing substrate illustrating an example of a white line caused by a missing nozzle.

Referring now in detail to the figures of the drawings, in which mutually corresponding elements have the same reference symbols, it is seen that the field of application of the preferred exemplary embodiment is an inkjet printing machine 7. FIG. 1 shows an example of the fundamental construction of such a machine 7, including a feeder 1 for feeding a printing substrate 2 to a printing unit 4, where it receives an image printed by print heads 5, before being fed to a delivery 3. The machine 7 is a sheet-fed inkjet printing machine 7 controlled by a control unit 6. While this printing machine 7 is in operation, individual printing nozzles in the print heads 5 in the printing unit 4 may fail as described above. Such a failure results in white lines 9 or, in the case of multicolor printing, in distorted color values. An example of such a white line 9 in a printed image 8 is shown in FIG. 2.

Figure 3:
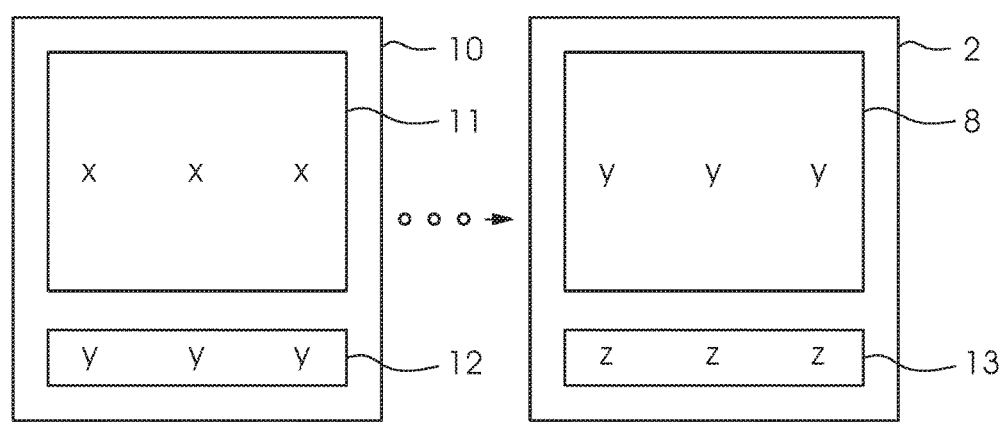
FIG. 3 is a plan view illustrating two print sheets with a shrunk control element that has been created in accordance with the method of the invention.
Figure 4:
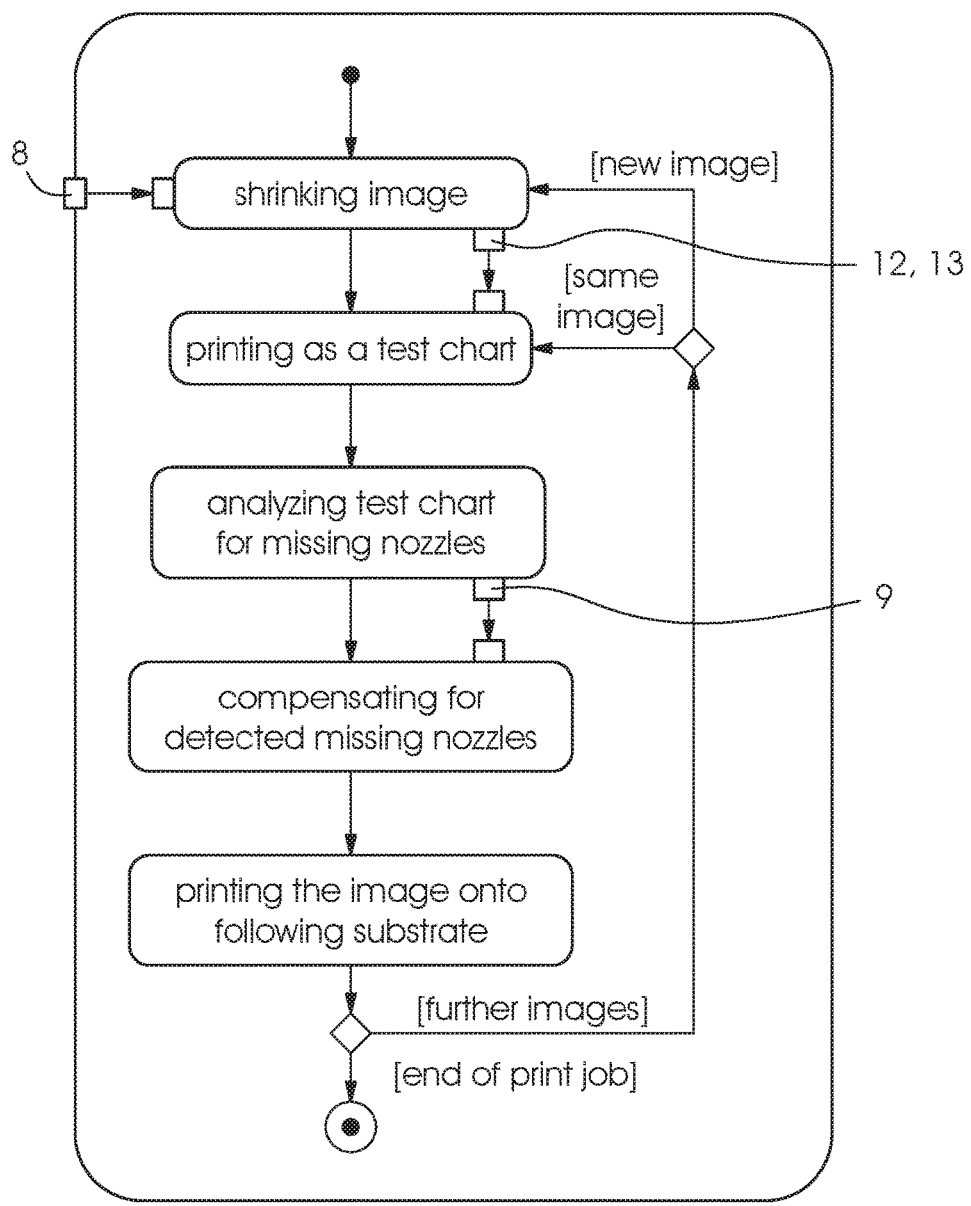
FIG. 4 is a flow chart of the method of the invention.

A flow chart of the preferred embodiment of the method of the invention is schematically shown in FIG. 4. When the image 8 for a current printing substrate or print sheet 2 shown as Y in FIG. 3 is prepared for printing, the image 8 is converted to a reduced printing length, for instance from 70 cm to 1 cm. The reduction of the printing length to only a few centimeters results in a reduction of 1 cm of the original printing length to approximately 4-8 camera pixels in the sheet-fed inkjet printing machines 7 that are currently in use. A higher scanning frequency of an inline camera results in a correspondingly higher resolution. The process is implemented by a computer, which may be the control unit 6 of the printing machine 7 or any other available computer. The only important aspect is that there needs to be a data link between the computer 6 and the sheet-fed inkjet printing machine 7 that is used, for instance a connection to a communication network. The shrinking is achieved by applying suitable interpolation methods. The printing width of the image 8 remains unmodified. Then a shrunk image 12 is separated into individual color separations by using ICC color profiles. In this process, the computer 6 implements a transformation from the RGB or Lab color spaces into the CMYKOGV process color space. Thus, in terms of its dimensions, the shrunk image 12 corresponds to a print control strip.

In the next step, the print control strip 12 that has been created in this way is printed and analyzed. In this process, the print control strip 12 is ideally printed below an image 11, for instance on the trailing edge of an upstream print sheet 10, marked by an X in FIG. 3. Depending on the requirements, for instance the computing time for the analysis, the calculated print control strip 12 may be printed onto a print sheet that is farther upstream, i.e. a sheet X-1, X-2, etc. These sheets are not shown in FIG. 3. Then the printed print control strip 12 is scanned by an inline camera of the image recording system and redigitized. The computer 6 subsequently calculates the individual color separations for CMYKOGV for the recorded print control strip 12 from the RGB camera data. Afterward the computer 6 compares the printing nozzle profiles that have been established on the basis of the print control strip 12 that has been printed and analyzed with those of the digitally available original image or those of the shrunk original image. Based thereon, the computer 6 determines the relevant defective printing nozzles for the image Y 8 of the current print sheet 2—for instance by detecting peaks in a resultant differential signal.

The last step is to compensate for the defective printing nozzles and to print the actual image Y 8 onto the current print sheet 2. An example of the described process is shown in FIG. 3. The printing of the original image onto the current print sheet 2 occurs without white lines 9 because the defective printing nozzles that have been detected in the individual colors as a result of the analysis are compensated for. This may be achieved by using the neighboring printing nozzles, for instance, or any other suitable compensation method. If further images are to be printed onto downstream print sheets, the method of the invention is repeated accordingly. In this case, a print control strip 13 for an image of the downstream sheet is again shrunk and placed, for instance, at the trailing edge of the current print sheet 2.

The method is suitable for a single copy; i.e. every page is only printed once. However, it may likewise be used for print runs of more than one copy. In an ideal case, the method eliminates all waste caused by white lines.

In a further preferred embodiment, a shortened nozzle detection chart may be printed in addition to the shrunk image 12, 13. This simplifies an accurate detection of the defective nozzles, i.e. it improves the pixel/nozzle allocation. If more than one copy is produced, the nozzle detection chart needs to be printed only once although the shrunk image used for detection purposes ought to be printed continuously.

In summary, in accordance with the method of the invention, the image 8, 11 of a print sheet 2, 10 is shrunk to the length of a control strip 12, 13, but continues to include the image content such as area coverages of the color separations of the unmodified image 8, 11. The shrunk image is printed onto the previous sheet 2, 10 as a control and detection element 12, 13 to be measured and analyzed. In this way, the critical nozzles that are relevant for the printing of the original image are detected in advance and compensated for in the actual printing operation.

The following is a summary list of reference numerals and the corresponding structure used in the above description of the invention.

LIST OF REFERENCE SYMBOLS

1 feeder
2 current printing substrate/current print sheet
3 delivery
4 inkjet printing unit
5 inkjet print head
6 computer
7 inkjet printing machine
8 image on the current print sheet
9 white line
10 previous print sheet
11 image on the previous print sheet
12 control patch formed of the shrunk image on the current print sheet
13 control patch formed of the shrunk image on the following print sheet

The invention claimed is:

1. A method for detecting and compensating for defective printing nozzles in an inkjet printing machine, the method comprising the following steps:

using a computer to shrink an image height of a digitally available image to an image height of a print control strip while leaving an image width uninfluenced;

printing the shrunk digital image onto a printing substrate;

using at least one image sensor to record the printed shrunk digital image;

using the computer to compare the recorded image with the shrunk digital image;

using the computer to detect defective printing nozzles for the digital image based on the comparison and compensating for the detected defective printing nozzles; and printing the digital image by using defective printing nozzle compensation on a subsequent printing substrate.

2. The method according to claim 1, which further comprises using the computer to carry out the shrinking of the image height of the digitally available image in the RGB, Lab, or process color space CMYK plus optional additional process colors, and using the computer to convert the digitally available image into the color space if it is not in the color space.

3. The method according to claim 1, which further comprises using the computer to carry out the shrinking by an application of interpolation processes.

4. The method according to claim 1, which further comprises using the computer to separate the shrunk digital image and the recorded image into individual color separations and then carry out the comparison between the shrunk digital image and the recorded printed image between the individual color separations.

5. The method according to claim 4, which further comprises using the computer to carry out the comparison between the shrunk digital image and the recorded image either in the RGB, Lab, or CMYK process color space plus optional additional process colors, and using the computer to convert those images that are not in a relevant color space into the relevant color space and to separate the shrunk digital image and the recorded image into the individual color separations in the color space.

6. The method according to claim 4, which further comprises carrying out the separation into the individual color separations and the conversion into a different color space by using ICC color profiles.

7. The method according to claim 5, which further comprises carrying out the separation into the individual color separations and the conversion into a different color space by using ICC color profiles.

8. The method according to claim 1, which further comprises carrying out the shrinking step by reducing the image height to a maximum of 10% of an original image height.

9. The method according to claim 1, which further comprises using the method for an inkjet printing machine in which the printed printing substrate corresponds to individual print sheets.

10. The method according to claim 8, which further comprises printing the shrunk digital image on the print sheet no later than immediately preceding the print sheet with the image to be printed.

11. The method according to claim 1, which further comprises in addition to the shrunk digital image, printing an adapted printing nozzle detection chart, recording the adapted printing nozzle detection chart by using the at least one image sensor, and analyzing the adapted printing nozzle detection chart by using the computer, to facilitate an allocation between detected printing nozzle defects and individual printing nozzles.

* * * * *